United States Patent
Kudo et al.

(10) Patent No.: US 10,480,741 B2
(45) Date of Patent: Nov. 19, 2019

(54) LIGHTING APPARATUS AND STRADDLE-TYPE VEHICLE

(71) Applicant: HONDA MOTOR CO., LTD., Minato-ku, Tokyo (JP)

(72) Inventors: Tomohiro Kudo, Wako (JP); Shota Yamasaki, Wako (JP); Mizuki Fujiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/088,844

(22) PCT Filed: Feb. 1, 2017

(86) PCT No.: PCT/JP2017/003552
§ 371 (c)(1),
(2) Date: Sep. 27, 2018

(87) PCT Pub. No.: WO2017/169078
PCT Pub. Date: Oct. 5, 2017

(65) Prior Publication Data
US 2019/0093843 A1    Mar. 28, 2019

(30) Foreign Application Priority Data
Mar. 31, 2016    (JP) .................. 2016-070365

(51) Int. Cl.
*F21S 41/19* (2018.01)
*B62J 6/02* (2006.01)
(Continued)

(52) U.S. Cl.
CPC .......... *F21S 41/192* (2018.01); *B60Q 1/0408* (2013.01); *B62J 6/02* (2013.01); *F21S 41/657* (2018.01); *B60R 13/105* (2013.01)

(58) Field of Classification Search
None
See application file for complete search history.

(56) References Cited

U.S. PATENT DOCUMENTS

2007/0195543 A1* 8/2007 Sugimoto ............ B60Q 1/0094
                                                     362/509
2008/0192498 A1* 8/2008 Suita .................... B60Q 1/0041
                                                     362/475
(Continued)

FOREIGN PATENT DOCUMENTS

EP    1452430    9/2004
EP    2052909    4/2009
(Continued)

OTHER PUBLICATIONS

International Search Report and Written Opinion for International Application No. PCT/JP2017/003552 dated Apr. 11, 2017, 11 pages.

*Primary Examiner* — Ashok Patel
(74) *Attorney, Agent, or Firm* — Amin, Turocy & Watson LLP

(57) ABSTRACT

A headlight is provided with a light source unit, an aiming mechanism which can adjust aiming with respect to the light source, a headlight cover which is arranged in front of the light source, and a housing which, by fitting with the headlight cover, covers the light source unit and the aiming mechanism. Inside of the headlight, and between the headlight cover and the light source unit, a stay is provided for arranging the light source unit and the aiming mechanism on the headlight cover.

8 Claims, 12 Drawing Sheets

(51) Int. Cl.
*B60Q 1/04* (2006.01)
*B60R 13/10* (2006.01)
*F21S 41/657* (2018.01)

(56) References Cited

U.S. PATENT DOCUMENTS

| | | | |
|---|---|---|---|
| 2011/0286228 | A1 | 11/2011 | Zanma |
| 2014/0009951 | A1* | 1/2014 | Monma .................. B62J 6/02 362/509 |

FOREIGN PATENT DOCUMENTS

| | | |
|---|---|---|
| JP | 2003-072659 | 3/2003 |
| JP | 2004-159153 | 6/2004 |
| JP | 2004-262296 | 9/2004 |
| JP | 2005-329759 | 12/2005 |
| JP | 2007-203828 | 8/2007 |
| JP | 2009-093807 | 4/2009 |
| JP | 2011-243520 | 12/2011 |
| JP | 2012-051444 | 3/2012 |
| JP | 2012-066752 | 4/2012 |

* cited by examiner

LIGHTING APPARATUS AND STRADDLE-TYPE VEHICLE

TECHNICAL FIELD

The present invention relates to a lighting device (apparatus) which, by fitting a front frame with a rear frame, accommodates therein a light source unit capable of making an aiming adjustment, and further to a saddle-type (straddle-type) vehicle provided with the lighting device.

BACKGROUND ART

For example, Japanese Laid-Open Patent Publication No. 2011-243520 discloses that a bulb as a light source and an aiming mechanism are provided in a housing as a rear cover and that a reflector, an extension as a front cover and a lens are in turn infixed in the housing from the front side to assemble a lighting device.

SUMMARY OF INVENTION

In a lighting device in which a front cover and the like are assembled with a rear cover by being pushed from the front side, it is necessary to also push a wire harness extending from a light source unit into the rear cover at the assembling time. Accordingly, the handling of the wire harness at the assembling time has been a problem.

Therefore, it is an object of the present invention to provide a lighting device capable of improving the assembling workability and a saddle-type vehicle provided with the lighting device.

A lighting device according to the present invention includes a light source unit, an aiming mechanism capable of making an aiming adjustment on the light source unit, a front frame disposed on the front side of the light source unit, and a rear frame covering the light source unit and the aiming mechanism by being fitted with the front frame, and the device has the following features.

First feature: A stay for arranging the light source unit and the aiming mechanism on the front frame is provided between the light source unit and the front frame.

Second feature: A fixing portion configured to fix an electrical harness extending from the light source unit is disposed on the stay.

Third feature: The fixing portion is disposed on an upper portion of the stay.

Fourth feature: In a view from behind, the electrical harness is wired to go around the light source unit in a counterclockwise direction from a right side through an upper side to a left lower side and reaches the light source unit.

Fifth feature: The front frame is fixed by a screw member to a bottom bridge of a saddle-type vehicle.

Sixth feature: A drain hole is formed at a portion fixing the front frame to the bottom bridge.

Further, a saddle-type vehicle according to the present invention is a saddle-type vehicle provided with the lighting device having the fifth or sixth feature, and the saddle-type vehicle has the following seventh or eighth feature.

Seventh feature: The saddle-type vehicle further includes a license plate disposed on a front side of the saddle-type vehicle and a plate stay supporting the license plate. In this case, the plate stay and the front frame are fixed together to the bottom bridge by the screw member.

Eighth feature: The plate stay includes a plate-like member whose outer peripheral portion is bent downward.

According to the first feature of the present invention, the stay being a separate member is provided between the front frame and the light source unit and the aiming mechanism, and the light source unit and the aiming mechanism are fixed to the front frame through the stay. Thus, at an assembling time, it is sufficient to fit the front frame with the rear frame after the electrical harness is routed from the light source unit with these mechanisms integrated. Because like this, the aiming mechanism and the like are arranged on the front frame side by the use of the stay, it is possible to improve the assembling workability of the lighting device.

According to the second feature of the present invention, by disposing the fixing portion on the stay, it is possible to integrate the electrical harnesses to be tied up on the fixing portion.

According to the third feature of the present invention, by disposing the fixing portion at the upper portion of the stay, it is possible to reduce a load exerted due to the twisting of the electrical harness.

According to the fourth feature of the present invention, by wiring the electrical harness in the counterclockwise direction around the light source unit, it is possible to further reduce the load exerted due to the twisting of the electrical harness.

According to the fifth feature of the present invention, by fixing the front frame to the bottom bridge by the screw member, it is possible to dispose the lighting device on the front side of the saddle-type vehicle.

According to the sixth feature of the present invention, by forming the drain hole at the portion fixing the front frame to the bottom bridge, the drainage from the fixing portion becomes easy.

According to the seventh feature of the present invention, because the plate stay and the front frame are fixed together to the bottom bridge by the screw member, it is possible to efficiently dispose the license plate on the front side of the saddle-type vehicle.

According to the eighth feature of the present invention, because the outer peripheral portion of the plate stay being the plate-like member is bent downward, it is possible in a simple configuration to reinforce the mechanical strength of the plate stay and, at the same time, to prevent water from staying around the periphery of the license plate.

DESCRIPTION OF EMBODIMENTS

Hereinafter, with reference to the accompanying drawings, a lighting device and a saddle-type vehicle according to the present invention will be described in detail based on preferred embodiments.

[Schematic Configuration of Motorcycle 10]

Figure 1:
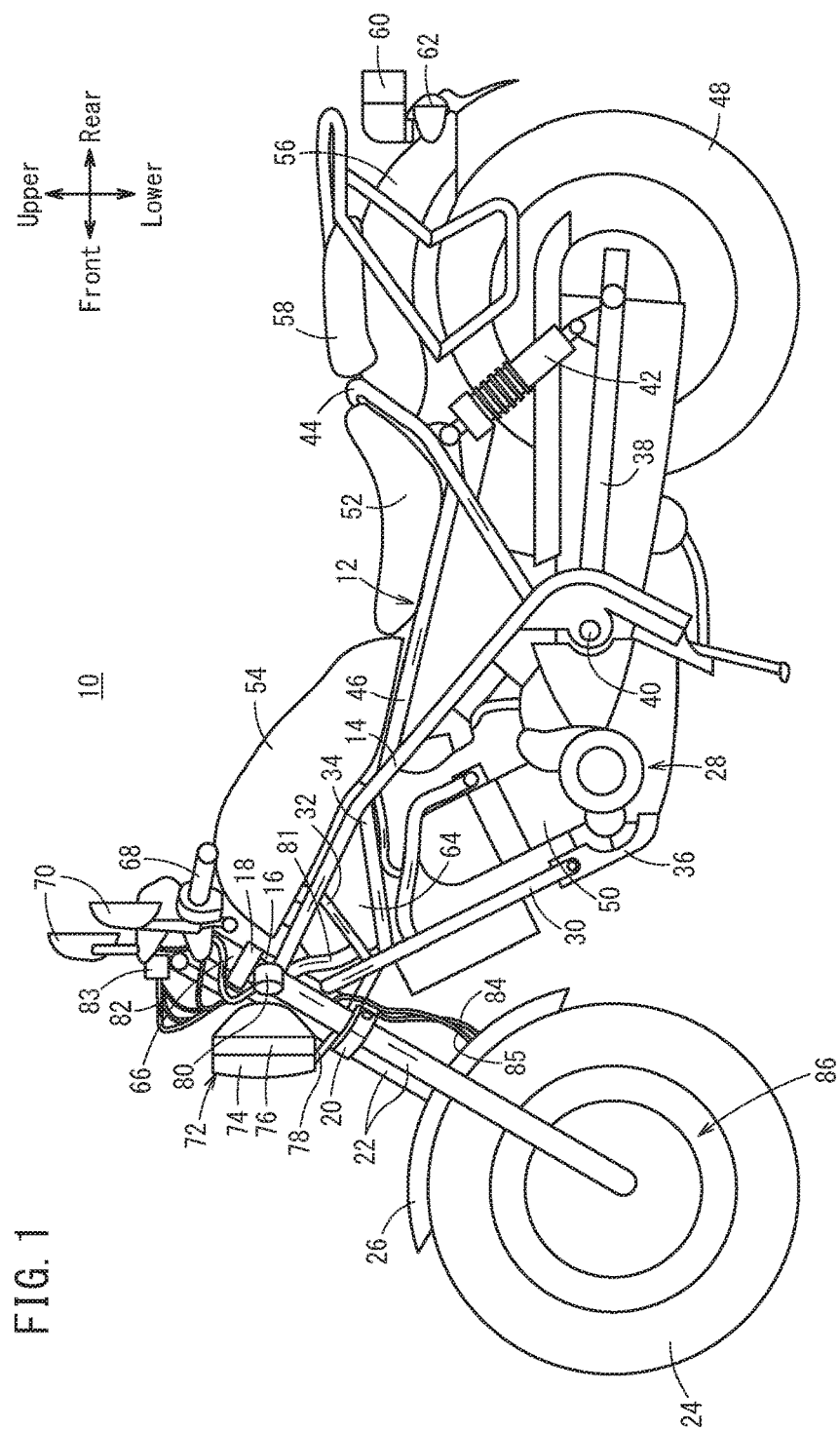
FIG. 1 is a left side view of a motorcycle according to the present embodiment.

FIG. 1 is a left side view showing a schematic configuration of a motorcycle 10 as a saddle-type vehicle according to the present embodiment. Incidentally, in the following description, on the assumption that the traveling direction of the motorcycle 10 is the front side, directions of front-rear, right-left and upper-lower will be described.

In the motorcycle 10, a head pipe 16 pivotally supporting a steering stem (not shown) is provided at front end portions of main frames 14 constituting a body frame 12. A top bridge 18 is fixed to an upper end portion of the steering stem, while a bottom bridge 20 is fixed to a lower end portion of the steering stem. The top bridge 18 and the bottom bridge 20 support a pair of right and left front forks 22. A front wheel 24 is rotatably supported at lower end portions of the front forks 22. Over the front wheel 24, a front fender 26 is attached to the front forks 22.

The main frames 14 are provided on their front sides with hanger frames 30 supporting an engine 28 on the front side. Front sides of the main frames 14 and upper sides of the hanger frames 30 are connected by a plurality of support frames 32, 34. A bracket 36 coupling the hanger frames 30 and the engine 28 is fixed to lower end portions of the hanger frames 30. On the other hand, a pivot 40 swingably supporting a swing arm 38 is provided at end portions curved downward on the rear sides of the main frames 14.

Rear sides of the swing arm 38 are supported by a rear frame 44 connected to rear portions of the main frames 14, through a pair of right and left rear cushions 42. The rear frame 44 is connected to the rear sides of the curved portions of the main frames 14. Portions over the engine 28 of the main frames 14 and intermediate portions of the rear frame 44 are connected by support frames 46.

A rear wheel 48 as a driving wheel is rotatably supported at rear end portions of the swing arm 38. Rotational driving power generated by the engine 28 is transmitted to the rear wheel 48 through a driving chain (not shown).

The engine 28 is fixed at a position surrounded by the main frames 14, the hanger frames 30, the bracket 36 and the pivot 40. A muffler (not shown) is attached to the front side of a cylinder block 50 of the engine 28 and is connected to an exhaust pipe on the rear side. On the other hand, the rear side of the cylinder block 50 is connected to a fuel injection system and an air cleaner box (not shown). Further, a rider's seat 52 is supported on the rear frame 44 and the support frames 46, and the rear cushions 42 are supported by the rear frame 44.

Over the engine 28, a fuel tank 54 of the shape that bestrides the main frames 14 at the center of the vehicle body in the right-left direction (vehicle width direction) is attached to the main frames 14. The aforementioned rider's seat 52 is disposed behind the fuel tank 54. A rear fender 56 is provided behind the rider's seat 52 and the rear frame 44. The rear fender 56 attaches thereto a passenger's seat 58, a tail lamp 60 and a pair of right and left rear blinkers 62.

The fuel tank 54 is disposed on upper portions of the main frames 14 behind the head pipe 16. On the other hand, an electrical component box 64 that houses electrical components of the motorcycle 10 is disposed over the upper and lower portions of the main frames 14 behind the head pipe 16. The fuel tank 54 is disposed over the main frames 14 so as to cover the electrical component box 64 from above. Further, the fuel tank 54 and the electrical component box 64 are disposed on the main frames 14 in a state of being integrally configured.

In the vicinity of the head pipe 16, an almost triangular space in the side view of FIG. 1 is formed by the main frames 14, the hanger frames 30 and the support frames 34. The electrical component box 64 is disposed in the almost triangular space between the main frames 14, the hanger frames 30 and the support frames 34 which are each one pair on the right and left sides. Therefore, the electrical component box 64 has an almost triangular shape in the side view of FIG. 1.

Incidentally, as the electrical components housed in the electrical component box 64, there are included, for example, an ignition coil, an ignition key, joint connectors connecting circuits, an ECU for controlling the engine 28, various relays (blinker relays, a pump relay, a fan relay, an ignition relay), a bank angle sensor, and various kinds of couplers. Incidentally, these are one example, and it is needless to say that other electrical components may be housed. Further, since these electrical components are well known, detailed description thereof will be omitted.

The top bridge 18 is provided at its upper portion with a pair of right and left handle fixing portions 66, and steering handles 68 are respectively fixed to the handle fixing portions 66. Rearview mirrors 70 are respectively fixed to the steering handles 68 being paired on the right and left sides.

On the front side of the head pipe 16, there is disposed a headlight 72 being a lighting device according to the present embodiment. The headlight 72 has a headlight cover 74 (front frame) and a housing 76 (rear frame) and is fixedly supported on the bottom bridge 20. In this case, support members 78 extend from a lower portion of the headlight cover 74 rearward and obliquely downward, and end portions of the support members 78 are fixed to the bottom bridge 20, so that the headlight 72 is supported on the front side of the head pipe 16. On the right and left sides of the headlight 72, blinkers 80 are respectively attached to the pair of right and left front forks 22.

Electrical components such as the headlight 72, the blinkers 80 and the like outside the electrical component box 64 are connected to electrical components (for example, ECU) inside the electrical component box 64 through a wire harness 81 (electrical component harness). For example, the wire harness 81 is pulled out from the front side of the electrical component box 64 and is routed to the headlight 72 and the blinkers 80.

Further, brake hoses 82, 84 and another wire harness 85 are pulled out from the front side of the electrical component box 64. One of the brake hoses 82 is connected to a master cylinder 83 attached to the steering handle 68 on the right side. Further, the other brake hose 84 is connected to a front wheel brake unit 86. The respective brake hoses 82, 84 are connected in the electrical component box 64. That another wire harness 85 is connected to a vehicle speed sensor (not shown) disposed near the front wheel brake unit 86.

Therefore, when the rider operates a front wheel brake lever (not shown) provided on the steering handle 68, a brake fluid pressure is applied from the master cylinder 83 to the front wheel brake unit 86 through the brake hoses 82, 84, whereby a braking power is applied to the front wheel 24. Further, the vehicle speed of the motorcycle 10 detected by the vehicle speed sensor is outputted to the ECU through the wire harness 85.

[Characteristic Configurations of the Present Embodiment]

Next, characteristic configurations of the headlight 72 and the motorcycle 10 with the headlight 72 according to the present embodiment will be described with reference to FIGS. 2 to 7. Incidentally, this description will be made with reference also to FIG. 1, if necessary.

Figure 2:
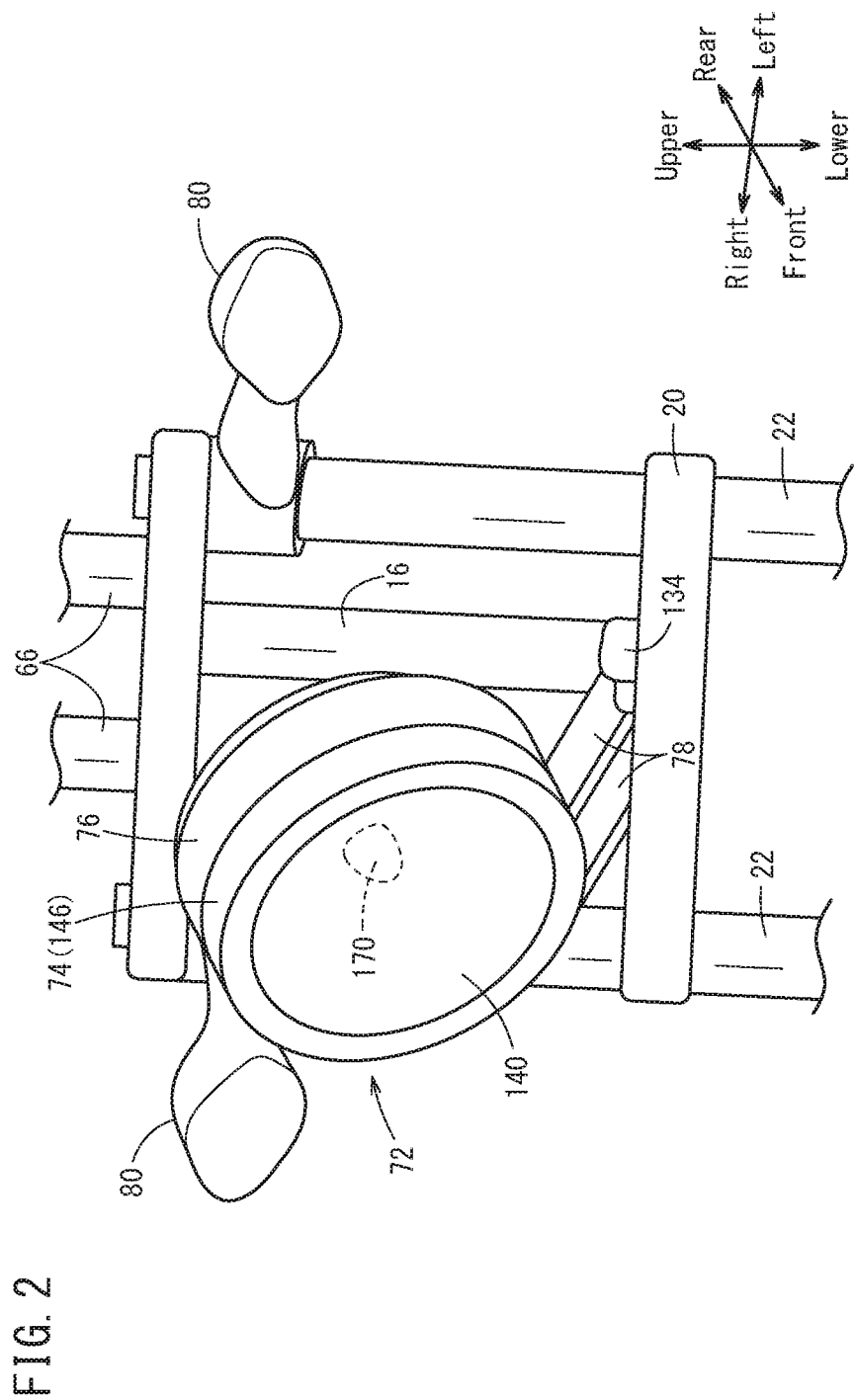
FIG. 2 is a fragmentary perspective view showing in an enlarge scale the periphery of a headlight shown in FIG. 1.
Figure 3:
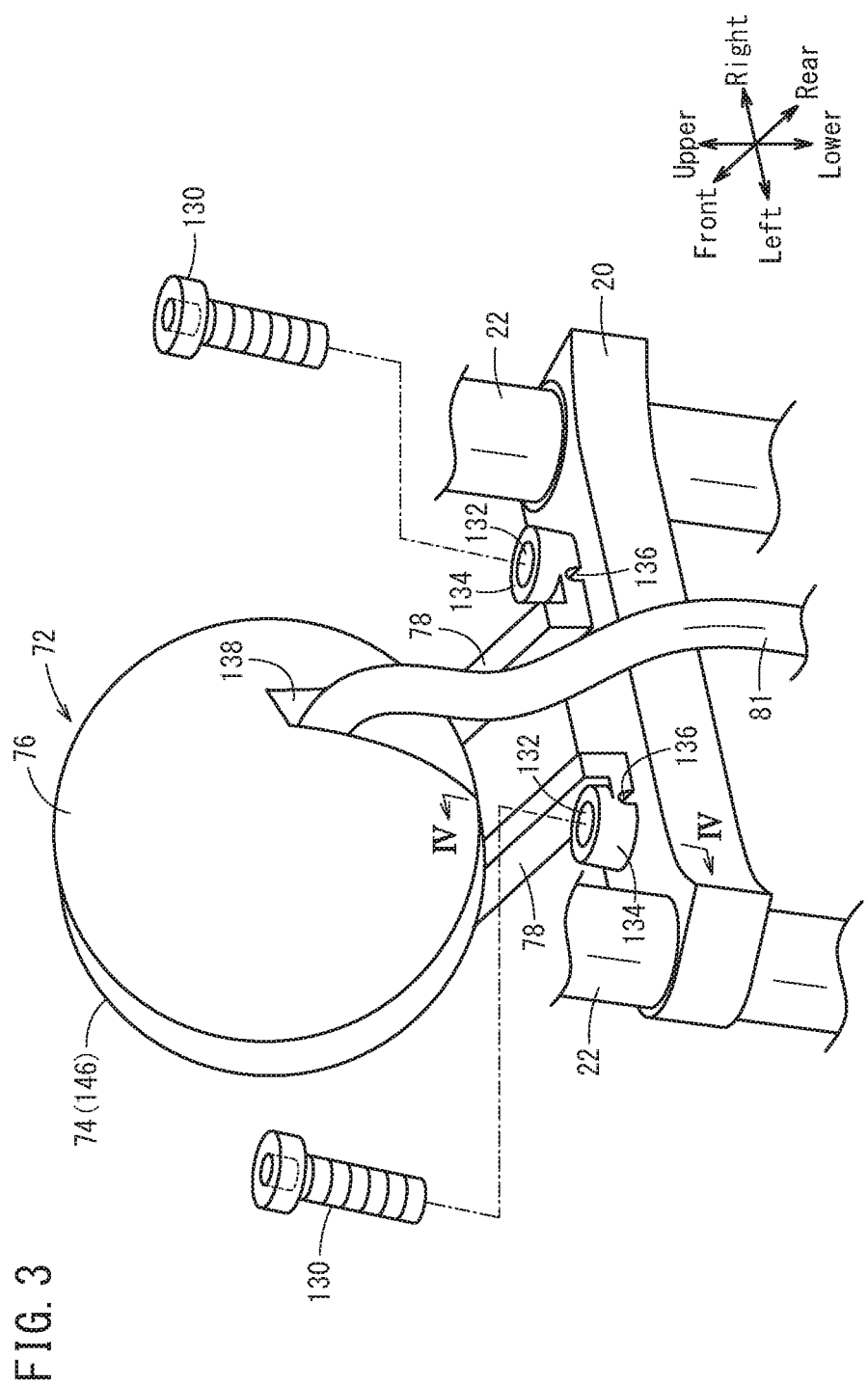
FIG. 3 is a fragmentary perspective view of the periphery of the headlight shown in FIG. 2 as viewed from behind.
Figure 4:
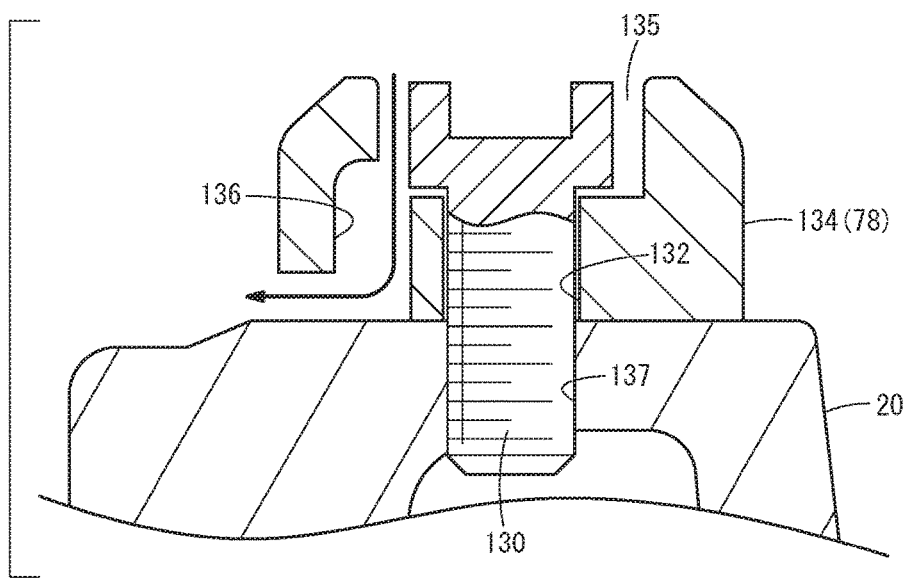
FIG. 4 is a sectional view taken along the line IV-IV in FIG. 3.
Figure 4:
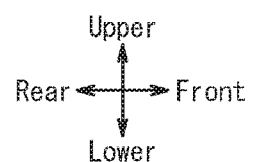

As shown in FIGS. 2 to 4, the end portions (lower end portions) of the pair of right and left support members 78 constituting the headlight 72 are configured respectively as annular portions 134 (fixing portions) which are vertically formed with screw holes 132 screw-engaged with screw members 130. The annular portions 134 each have formed inside a recess 135 capable of accommodating a head portion of the screw member 130. At a rear portion of the recess 135, a drain hole 136 taking an almost L-shape in section is formed to extend downward from the recess 135 and to pierce rearward.

Further, screw holes 137 being almost the same diameter as the respective screw holes 132 are vertically formed in the bottom bridge 20. Thus, when the screw members 130 are each screw-engaged with respective screw holes 132, 137 with the screw holes 132 of the annular portions 134 held in alignment almost coaxially with the screw holes 137 of the bottom bridge 20, the headlight 72 is fixed to the bottom bridge 20. As shown in FIG. 4, in the state that the head portion of the screw member 130 is accommodated in the recess 135, a gap is formed in the vertical direction between the rear portion of the recess 135 and the screw member 130, and thus, the gap communicates with the drain hole 136. Accordingly, the water entering the recess 135 is drained from the gap through the drain hole 136 to the rear side of the annular portion 134 and the bottom bridge 20, as indicated by the arrow in FIG. 4.

As shown in FIG. 3, an opening 138 is formed on a back surface of the housing 76 of the headlight 72. As shown in FIG. 1, the headlight 72 is provided at a higher position than the electrical component box 64, that is, at a position which is ahead of and obliquely above the electrical component box 64. Therefore, the wire harness 81 is pulled out from a front portion of the electrical component box 64, is extended obliquely upward toward the front side and is led to the inside of the headlight 72 through the opening 138.

Figure 5:
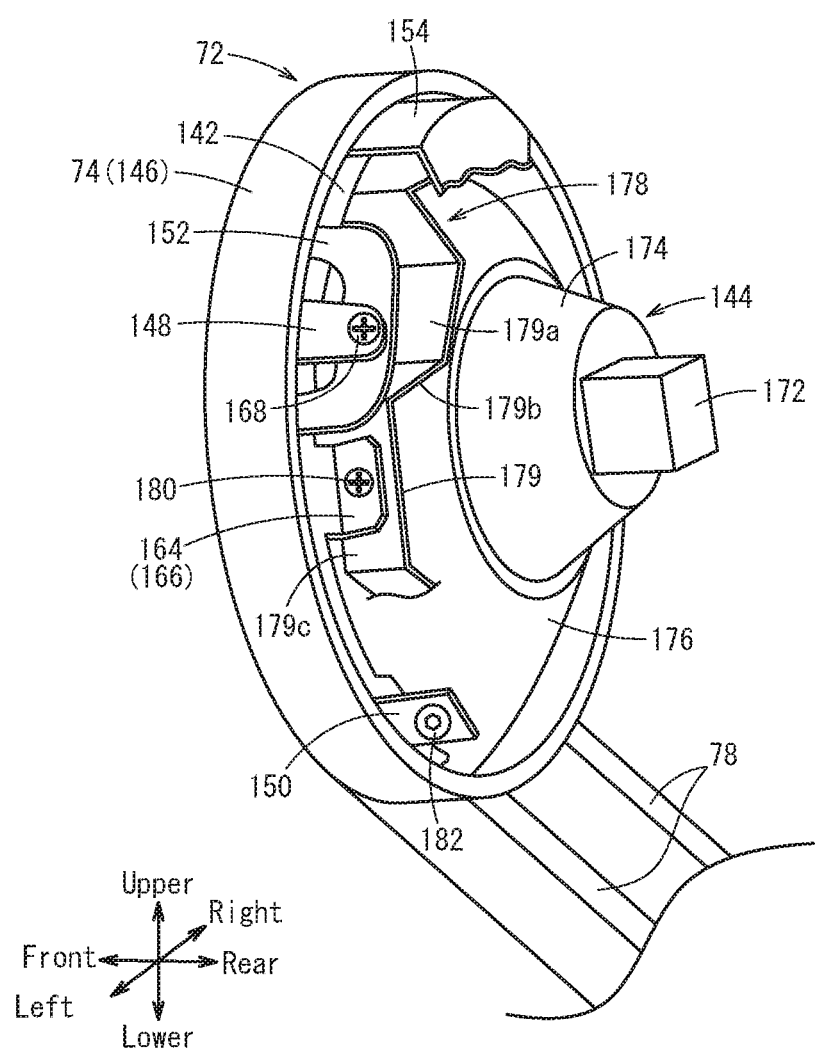
FIG. 5 is a perspective view of the headlight showing the state that a housing is detached from the headlight.
Figure 6:
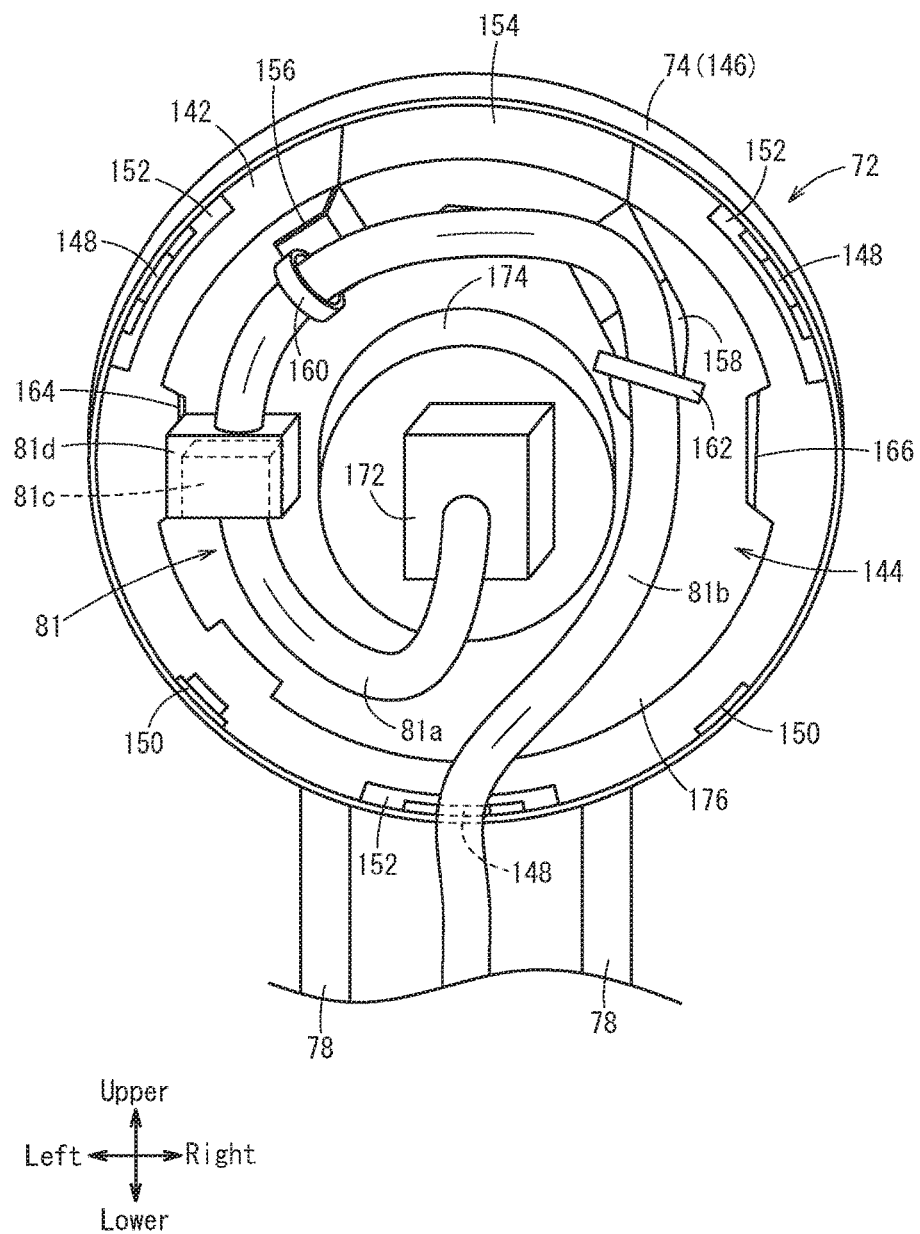
FIG. 6 is a rear view of the headlight showing the state that the housing and a reflector are detached from the headlight.

The headlight 72 is configured through the fitting of the housing 76 with the headlight cover 74. FIGS. 5 and 6 show the state that the housing 76 has been removed from the headlight 72.

To the headlight cover 74, a lens 140 (refer to FIG. 2), a stay 142 (refer to FIG. 7) and a light source unit 144 are sequentially attached from behind. The lens 140 is fitted in a front opening on an annular frame 146 constituting the headlight cover 74. Further, plate-like attaching portions 148 extending rearward are provided at two places on the upper side and one place on the lower side of the frame 146 at intervals of almost 120 degrees. Further, on the lower side of the frame 146, other attaching portions 150 extending rearward are provided on both right and left sides with the attaching portion 148 on the lower side put therebetween. Incidentally, FIG. 5 illustrates in a simplified manner those portions on the left side only of other components than the headlight cover 74 and the light source unit 144.

Figure 7:
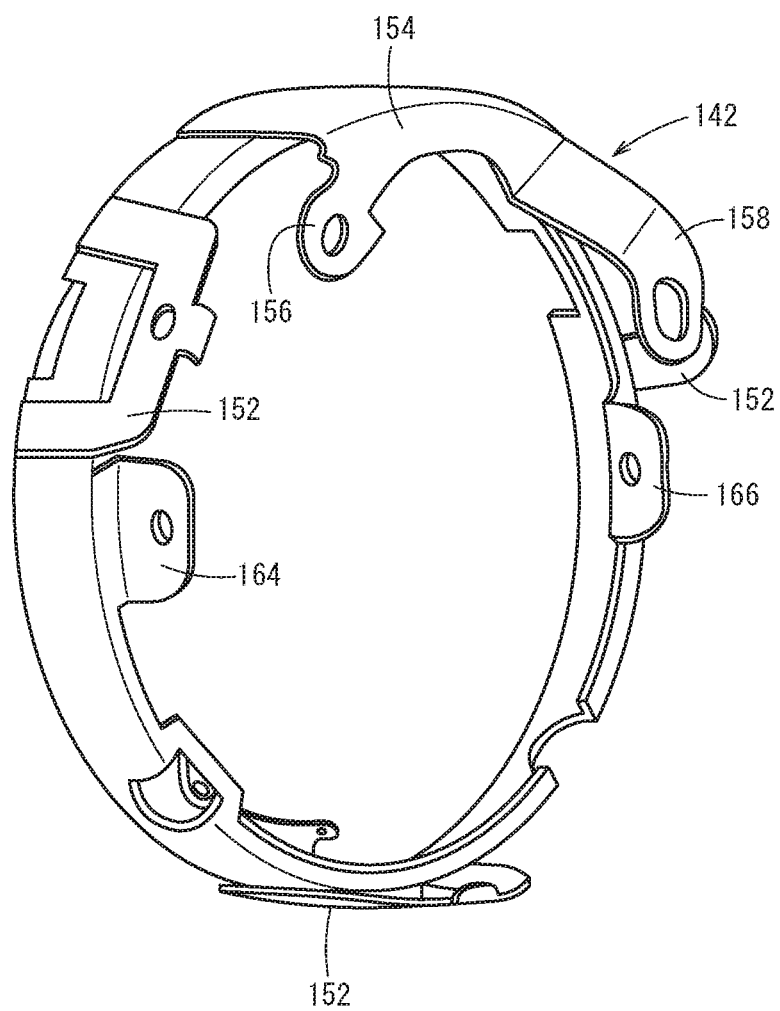
FIG. 7 is a perspective view of a stay.

As shown in FIGS. 5 to 7, the stay 142 is an almost annular member disposed inside the headlight cover 74. The stay 142 is provided with attaching portions 152 of an almost U-shape which extend rearward in correspondence to the respective attaching portions 148 of the headlight cover 74.

Further, the stay 142 is provided at the upper portion with a projection 154 extending rearward. A rear end portion of the projection 154 is bent downward, and two protrusions 156, 158 extend from the bent portion along the circumferential direction of the stay 142. The protrusions 156, 158 are respectively provided with fixing portions 160, 162 such as binding bands or the like.

Protrusions 164, 166 protruding inward are respectively provided at right and left sides of the stay 142. The protrusions 164, 166 each have a shape which extends inward from the stay 142 and whose end portion is bent rearward.

Each attaching portion 148 of the headlight cover 74 and each attaching portion 152 of the stay 142 are respectively formed with screw holes of almost the same diameter. In the state that the screw hole of each attaching portion 148 is aligned with the screw hole of each attaching portion 152 after the stay 142 is inserted inside the headlight cover 74, it is possible to fixedly position the stay 142 inside the headlight cover 74 by screw-engaging the screw members 168 with the respective screw holes.

As shown in FIGS. 5 and 6, the light source unit 144 is disposed inside the stay 142. The light source unit 144 has a light source 170 (refer to FIG. 2) such as a bulb, an LED or the like, a drive unit 172 as a driver for driving the light source 170, a fixing unit 174 fixing the light source 170 and the drive unit 172, and a semi-conical reflector 176 fixed to the fixing unit 174.

The fixing unit 174 is a bottomed cylindrical member and is formed with a hole at a bottom portion on the rear side of the vehicle. The drive unit 172 is fixed so as to close the hole at the bottom portion of the fixing unit 174. The light source 170 is connected to the drive unit 172 by being fixed from the front side of the vehicle to a position forming the hole in the fixing unit 174. The reflector 176 is fixed to the fixing unit 174 by being fitted inside the cylindrical portion of the fixing unit 174 from the front side of the vehicle.

An aiming mechanism 178 capable of performing an aiming adjustment for the light source unit 144 is interposed between the reflector 176 and the stay 142. The aiming mechanism 178 has an annular member 179 which successively connects an inside plate-like portion 179*a* abuttable on the reflector 176 side, connection portions 179*b* connected to the inside plate-like portion 179*a*, and outside plate-like portions 179*c* abuttable on the stay 142 side. In this case, the aiming mechanism 178 is disposed inside the stay 142 so as to make two outside plate-like portions 179*c* face the protrusions 164, 166 of the stay 142 respectively. Incidentally, FIG. 5 shows a portion only of the annular member 179 in a simplified manner, while FIG. 6 omits the illustration of the aiming mechanism 178.

The two outside plate-like portions 179*c* and the respective protrusions 164, 166 are respectively formed with screw holes of almost the same diameter. In this case, since the screw members 180 are screw-engaged with the respective screw holes in the state that the respective screw holes of the outside plate-like portions 179*c* and the protrusions 164, 166 which face each other are held in alignment, the aiming mechanism 178 is fixedly positioned inside the stay 142.

Incidentally, in fact, the aiming mechanism 178 constitutes a gimbal by the combination of a plurality of annular members 179, and the gimbal holds the light source unit 144. Thus, the light source unit 144 is capable of adjusting its optical axis by the gimbal in the vertical direction and the right-left direction.

The wire harness 81 is connected to a rear portion of the drive unit 172. As shown in the rear view of FIG. 6, the wire harness 81 led inside the headlight 72 through the opening 138 (refer to FIG. 3) is routed in the counterclockwise direction around the light source unit 144. That is, between the fixing unit 174 and the stay 142, the wire harness 81 goes from the lower side through the right side to reach the upper side of the fixing unit 174 and is further wired from the upper side to the left lower side to reach the drive unit 172. In this case, two portions of the wire harness 81 above the fixing unit 174 are fixed by the two fixing portions 160, 162.

Incidentally, the wire harness 81 is configured by a first harness 81a extending from the drive unit 172, a second harness 81b led inside the headlight 72 through the opening 138, a first connector 81c of the first harness 81a, and a second connector 81d of the second harness 81b. In this case, the second harness 81b is routed in the counterclockwise direction around the light source unit 144 and is fixed to the fixing portions 160, 162. The first connector 81c and the second connector 81d are connected on the left side of the light source unit 144.

[Assembling Method of Headlight 72]

Next, description will be given regarding an assembling method for the headlight 72 according to the present embodiment.

First, the lens 140 is infixed in the opening portion at the front portion of the headlight cover 74. Subsequently, the stay 142 is infixed in the headlight cover 74. Then, the screw members 168 are screw-engaged with the respective screw holes with the screw holes of the respective attaching portions 148 of the headlight cover 74 aligned with the screw holes of the respective attaching portions 152 of the stay 142, whereby the stay 142 is fixed to the headlight cover 74.

Then, while the drive unit 172 and the reflector 176 are attached to the fixing unit 174, the light source 170 is attached to the fixing unit 174 to configure the light source unit 144. The light source unit 144 configured like this is disposed inside the stay 142.

Thereafter, the aiming mechanism 178 is inserted between the stay 142 and the light source unit 144. In this case, the aiming mechanism 178 is infixed in the stay 142, and the screw holes of the two facing outside plate-like portions 179c are positioned relative to the screw holes of the protrusions 164, 166. Then, the screw members 180 are screw-engaged with the respective screw holes to fix the aiming mechanism 178 inside the stay 142. Thus, the light source unit 144 is held inside the stay 142 by the gimbal of the annular member 179 constituting the aiming mechanism 178, whereby the headlight cover 74, the lens 140, the stay 142, the light source unit 144 and the aiming mechanism 178 are integrally configured. Incidentally, after the fixing of the aiming mechanism 178, the aiming adjustment of the light source unit 144 by the aiming mechanism 178 is carried out properly.

Then, the wire harness 81 is routed from the rear portion of the drive unit 172. Specifically, the first connector 81c of the first harness 81a extending from the drive unit 172 is coupled with the second connector 81d of the second harness 81b. Then, between the fixing unit 174 and the stay 142, the second harness 81b is routed around the fixing unit 174 in the clockwise direction in FIG. 6. At this time, since the fixing portions 160, 162 are provided at the upper portions of the stay 142, the second harness 81b routed to the upper portion of the stay 142 is fixed by the fixing portions 160, 162. The second harness 81b whose portions are fixed by the fixing portions 160, 162 is routed to the right lower side in FIG. 6.

Subsequently, after the second harness 81b routed to the right lower side is made to pass through the opening 138 at the rear portion of the housing 76, a front end portion of the housing 76 is fitted in the rear portion of the headlight cover 74. In this case, the two attaching portions 150 of the headlight cover 74 are respectively formed with screw holes, while two screw holes (not shown) are respectively formed at lower portions of the housing 76. After the two screw holes of the housing 76 are aligned with the screw holes of the respective attaching portions 150, screw members 182 are screw-engaged with the respective screw holes, whereby the headlight cover 74 is secured to the housing 76. This results in the state that the headlight 72 accommodates therein the stay 142, the light source unit 144 and the aiming mechanism 178 and that the wire harness 81 (second harness 81b) is pulled out from the opening 138.

Subsequently, after the screw holes 132 of the annular portions 134 of the support members 78 are aligned with the screw holes 137 of the bottom bridge 20, the screw members 130 are screw-engaged with the respective screw holes 132, 137, whereby the headlight 72 is secured to the bottom bridge 20. Then, the wire harness 81 pulled out from the opening 138 is connected to the ECU inside the electrical component box 64 through an opening formed at the front portion of the electrical component box 64.

Effects of the Embodiment

As described above, in the headlight 72 and the motorcycle 10 with the headlight 72 according to the present embodiment, the stay 142 being a separate member is provided between the headlight cover 74, the light source unit 144 and the aiming mechanism 178, and the light source unit 144 and the aiming mechanism 178 are fixed to the headlight cover 74 through the stay 142. Thus, at the time of the assembling of the headlight 72, after the wire harness 81 is routed from the light source unit 144 with these mechanisms integrated, it is possible to fit the headlight cover 74 with the housing 76. Like this, because the stay 142 enables the light source unit 144, the aiming mechanism 178 and the like to be disposed on the headlight cover 74 side, it is possible to improve the assembling workability of the headlight 72 in comparison with the technology disclosed in Japanese Laid-Open Patent Publication No. 2011-243520.

Further, since the fixing portions 160, 162 for fixing the wire harness 81 extending from the light source unit 144 are arranged on the stay 142, it becomes possible to integrate the wire harness 81 in the form of being tied up on the fixing portions 160, 162.

In this case, since the fixing portions 160, 162 are provided at the upper portions of the stay 142, it is possible to mitigate the load exerted on the wire harness 81 due to the twisting which is caused by the operation of the steering handles 68 by the rider.

That is, when the rider operates the steering handles 68 to turn the same right and left, the headlight 72 and the like arranged around the handles are turned to the right and left, at which time a twisting force caused by the turning to the right and left is exerted on the wire harness 81. In this case, the shorter the wire harness 81 is, the larger the twisting force acts. Therefore, in this embodiment, the fixing portions 160, 162 are provided at the upper portions of the stay 142, and the wire harness 81 is secured at the fixing portions 160, 162. This makes it possible to gain the length of the wire harness 81 and thus, to reduce the twisting force exerted on the wire harness 81.

Incidentally, the headlight 72 from which the wiring harness 81 is pulled out is located above the electrical component box 64. Such a positional relationship between the headlight 72 and the electrical component box 64 makes it possible to further gain the length of the wire harness 81. Accordingly, it becomes possible to further reduce the twisting force.

Further, in the rear view of FIG. 6, the wire harness 81 reaches the drive unit 172 by being wired to go around the light source unit 144 in the counterclockwise direction from the right side through the upper side to the left lower side. Accordingly, the twisting force acting on the wire harness 81 is further reduced, and hence, it is possible to further reduce the load caused by the twisting.

Furthermore, by fixing the annular portions 134 being the distal portions of the support members 78 for the headlight cover 74 to the bottom bridge 20 by the screw members 130, it is possible to dispose the headlight 72 on the front side of the motorcycle 10.

Still furthermore, the annular portions 134 are each formed with the drain hole 136. This facilitates drainage at the recesses 135 of the annular portions 134.

Modification of the Embodiment

Next, a modification of the motorcycle 10 according to the present embodiment will be described with reference to FIGS. 8 to 12. Incidentally, the same components as those shown in FIGS. 1 to 7 will be given the same reference numerals, and the detailed description thereof will be omitted.

Figure 8:
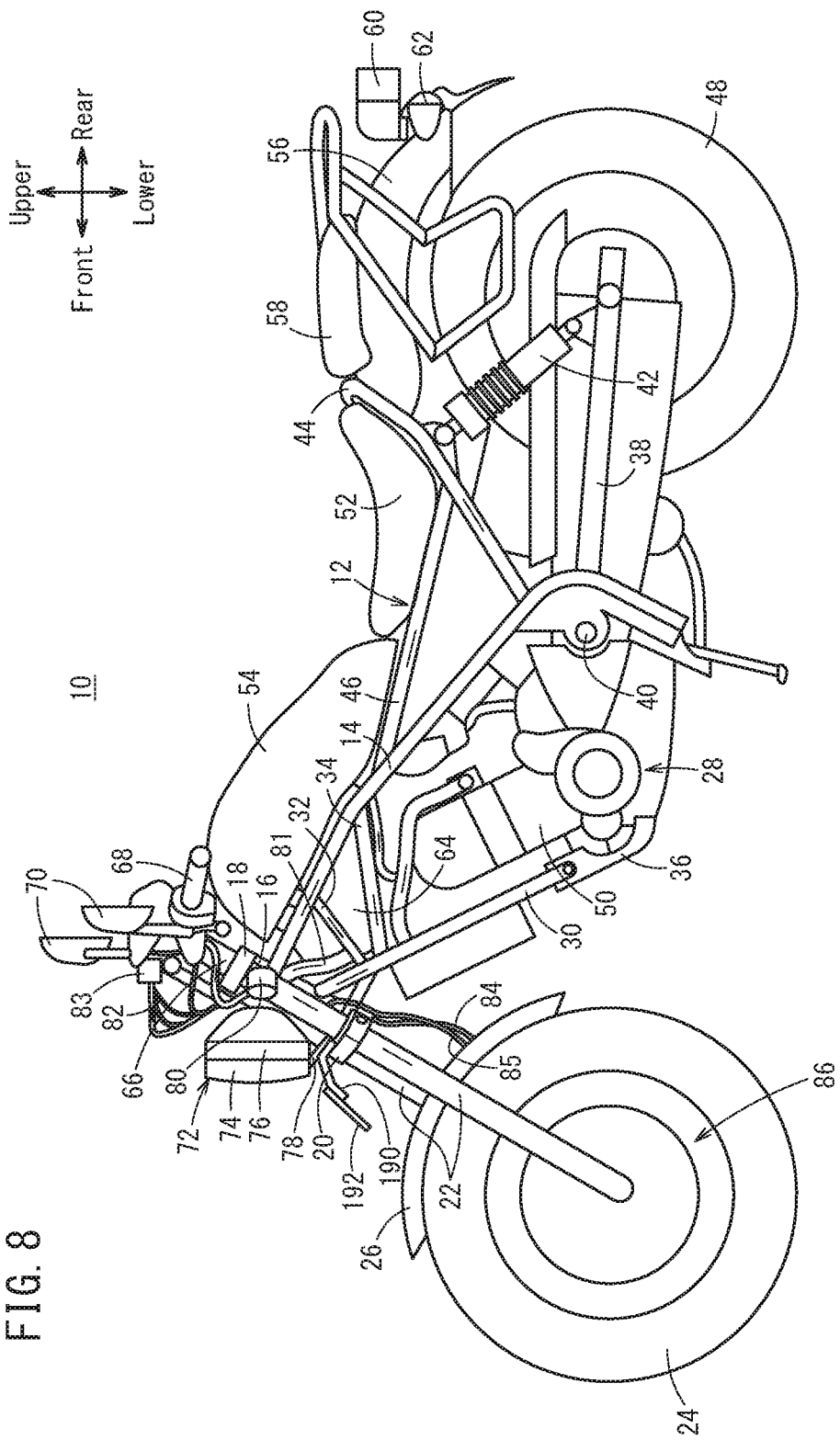
FIG. 8 is a left side view showing a modification of the motorcycle shown in FIG. 1.
Figure 9:
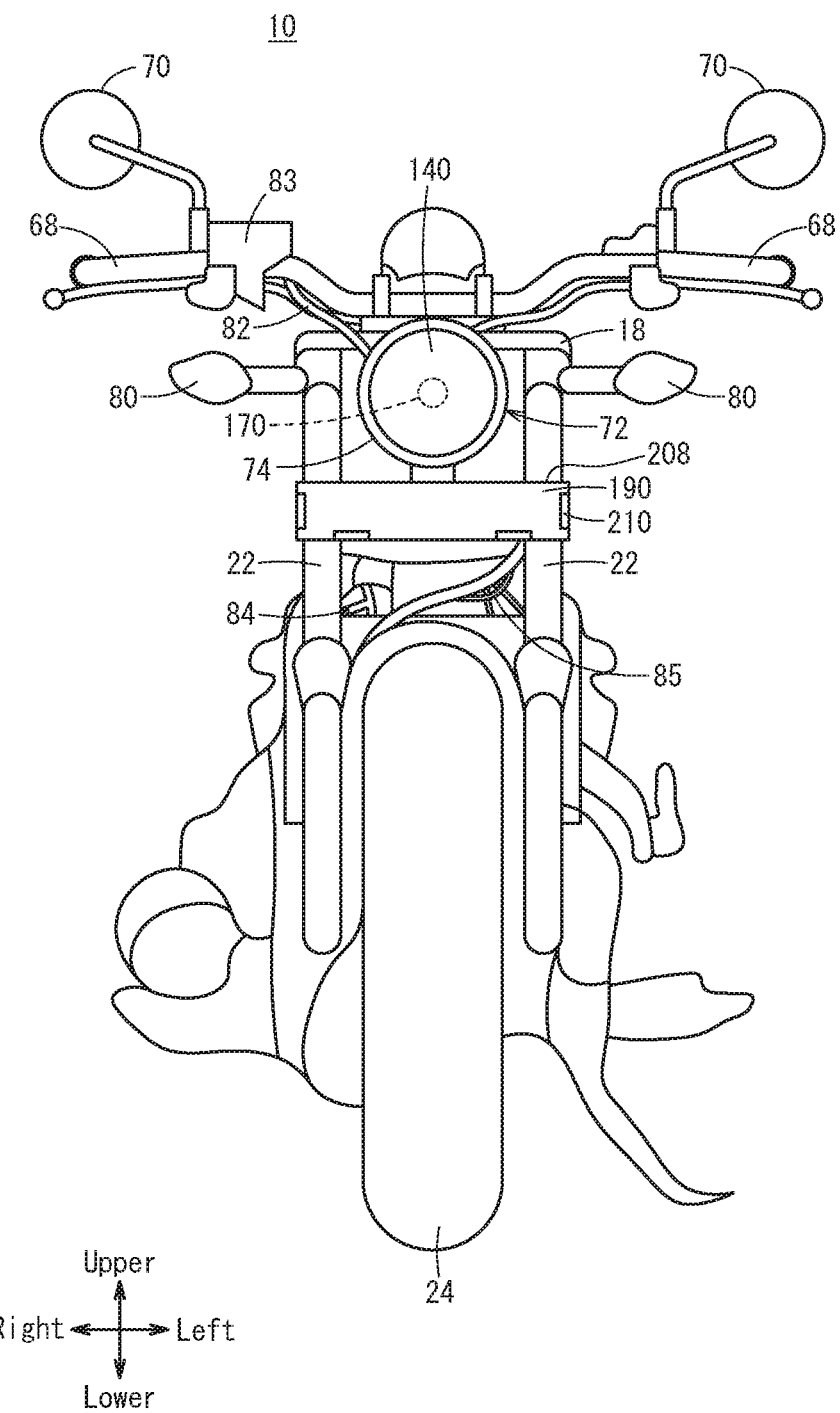
FIG. 9 is a front view of the motorcycle shown in FIG. 8.
Figure 10:
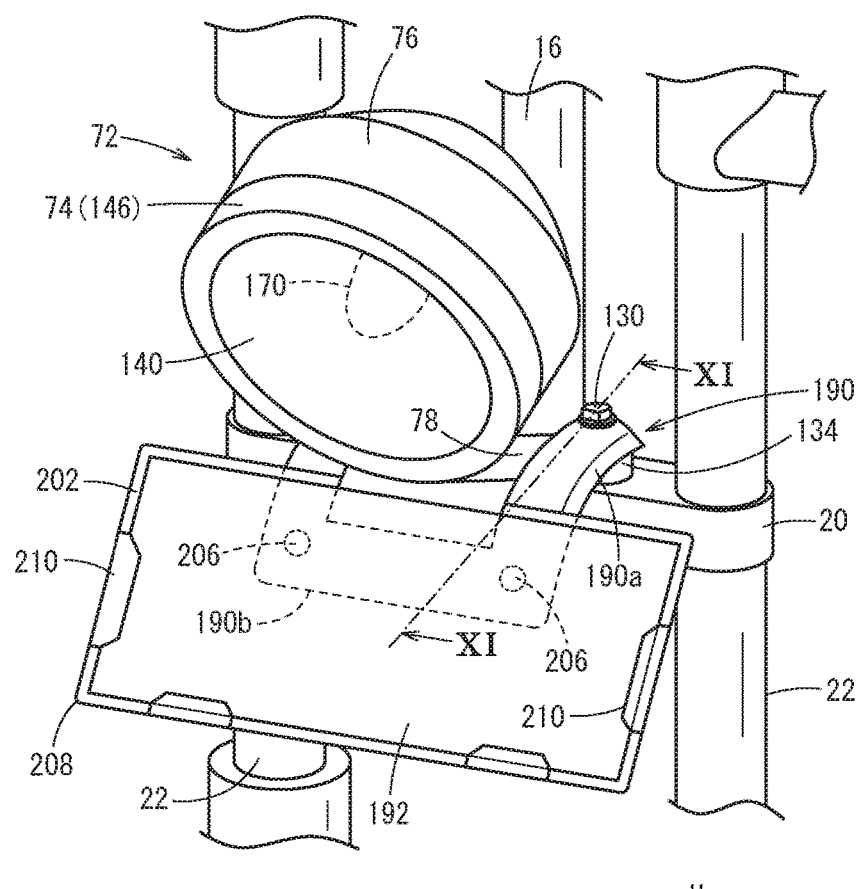
FIG. 10 is a fragmentary perspective view showing in an enlarged scale the periphery of a license plate shown in FIGS. 8 and 9.
Figure 11:
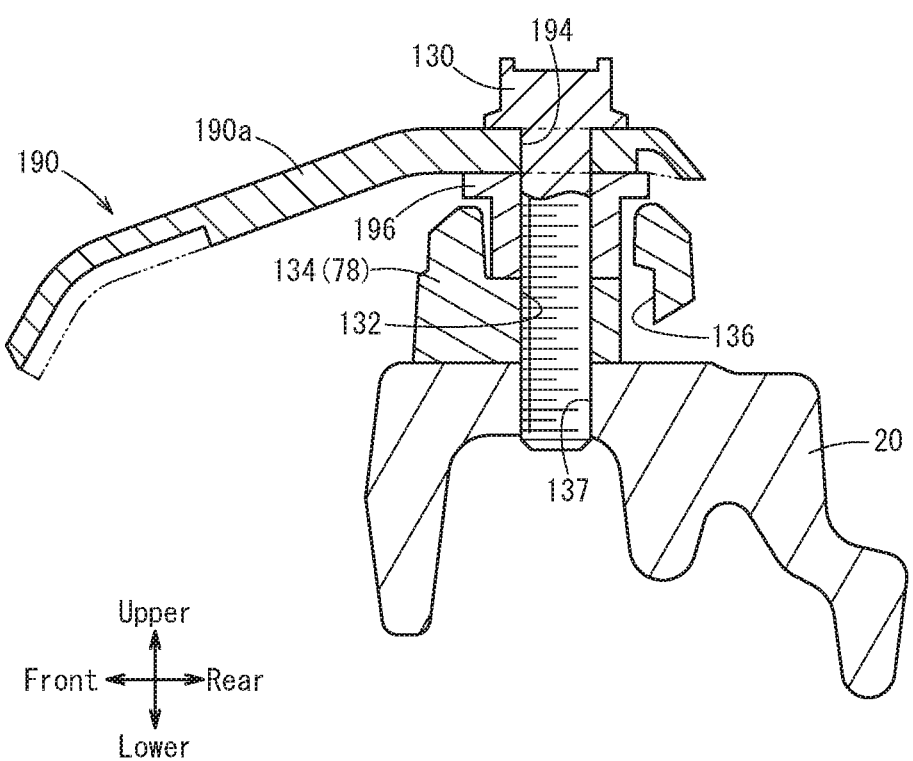
FIG. 11 is a sectional view taken along the line XI-XI in FIG. 10.

In the modification, as shown in FIGS. 8 to 10, a plate stay 190 fixedly supported on the bottom bridge 20 extends forward, and a license plate 192 (number plate) is supported at a front end portion of the plate stay 190. The license plate 192 is supported on the front side of the motorcycle 10 in a space between the headlight 72 and the front fender 26.

Figure 12:
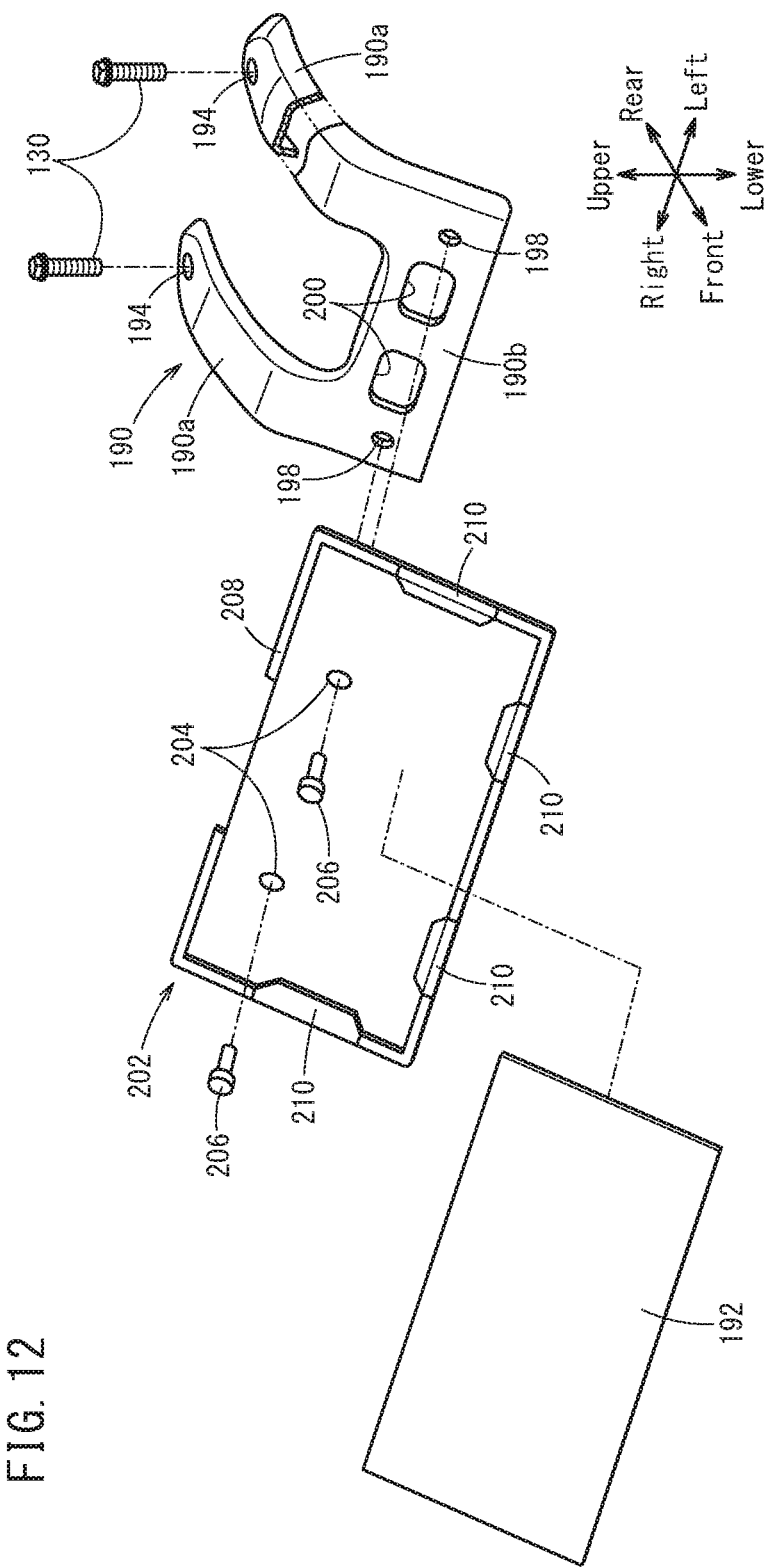
FIG. 12 is a fragmentary perspective view in a disassembled state of the periphery of the license plate shown in FIGS. 8 to 10.

Specifically, as shown in FIGS. 10 and 12, the plate stay 190 is an almost U-shape plate-like member being right-left symmetrical in appearance. That is, the plate stay 190 is configured by extending portions 190a extending forward from the both right and left sides of the bottom bridge 20 and a connecting portion 190b connecting front ends of the right and left extending portions 190a.

In this case, the outer peripheral portion of each extending portion 190a and an upper portion and both right and left ends of the connecting portion 190b are bent (are flexed) downward. As one example, in the cross-sectional view of FIG. 11, a rear end of each extending portion 190a is bent downward. In FIG. 12, a portion of the extending portion 190a on the left side is broken to illustrate that the both right and left ends of each extending portion 190a are bent downward.

Further, the right and left extending portions 190a are substantially flat at rear end portions over the bottom bridge 20 and each take a shape tilted obliquely downward toward the front side. On the other hand, the connecting portion 190b is continuous to the respective extending portions 190a and takes a shape tilted obliquely downward toward the front side.

Then, through holes 194 piercing in the vertical direction are formed at rear end portions of the respective extending portions 190a. The screw members 130 are inserted through the through holes 194 and cylindrical collars 196 and are screw-engaged with the screw holes 132 of the annular portions 134 of the support members 78 and the screw holes 137 of the bottom bridge 20. Thus, the plate stay 190 and the support members 78 are fixed together to the bottom bridge 20 by the screw members 130. Incidentally, it is to be noted that in the modification, in order to secure the plate stay 190 and the support members 78 together to the bottom bridge 20, the screw members 130 are each relatively long in comparison with those in the case of FIG. 3 and FIG. 4.

The connecting portion 190b being substantially rectangular is formed with through holes 198 on both right and left sides and is formed on right and left sides in the center with rectangular hole portions 200 for lightening. A plate attaching unit 202 for attaching the license plate 192 is attached to the connecting portion 190b. The plate attaching unit 202 is a rectangular plate-like member being larger in flat area than the connecting portion 190b and is formed with through holes 204 in correspondence to the respective through holes 198. Rivets 206 are inserted into the through holes 198, 204 on the right and left sides and are caulked, so that the plate attaching unit 202 is fixed to the connecting portion 190b.

The outer peripheral portion of the plate attaching unit 202 is formed as a frame portion 208 protruding forward. The frame portion 208 is formed at right, left and lower portions with a plurality of retaining portions 210 each directed inward. Thus, a gap is formed between each retaining portion 210 and a front face of the plate attaching unit 202.

The license plate 192 has a slightly thinner thickness than the gap and is a rectangular plate-like member having a plane area being about an inner portion of the frame portion 208 of the plate attaching unit 202. Thus, the license plate 192 is inserted into a space portion defined by the front face of the plate attaching unit 202 and the frame portion 208, and the retaining portions 210 support the license plate 192 from right, left and below. Thus, the license plate 192 is mounted on the plate attaching unit 202.

Like this, in the modification of FIGS. 8 to 12, since the plate stay 190 and the support members 78 are fixed together to the bottom bridge 20 by the screw members 130, it is possible to efficiently dispose the license plate 192 on the front side of the motorcycle 10. In particular, this is suitable in the country that has legislated attaching the license plate 192 on the front side of the motorcycle 10.

Further, since the outer peripheral portion of the plate stay 190 being a plate-like member is bent downward, it is possible in the simple configuration to reinforce the mechanical strength of the plate stay 190 and, at the same time, to prevent water from staying around the license plate 192.

Although the present invention has been described hereinabove based on the preferred embodiments, the technical scope of the present invention is not limited to the extent having been described in the foregoing embodiments. It is clear for those skilled in the art that various modifications or improvements are possible to be added to the foregoing embodiments. From the scope of the claims, it is clear that embodiments including such modifications or improvements are encompassed by the technical scope of the present invention. Further, numerals parenthesized in the claims are added in accordance with the numerals in the accompanying drawings to facilitate the understanding of the present invention, and the present invention should not be construed to be limited to the elements with the numerals.

What is claim is:

1. A lighting device including a light source unit, an aiming mechanism capable of making an aiming adjustment on the light source unit, a front frame disposed on a front side of the light source unit, and a rear frame covering the light source unit and the aiming mechanism by being fitted with the front frame,
wherein a stay for arranging the light source unit and the aiming mechanism on the front frame is provided between the light source unit and the front frame.

2. The lighting device according to claim 1, wherein:
a fixing portion configured to fix an electrical harness extending from the light source unit is disposed on the stay.

3. The lighting device according to claim 2, wherein:
the fixing portion is disposed at an upper portion of the stay.

4. The lighting device according to claim 2, wherein:
in a view from behind, the electrical harness is wired to go around the light source unit in a counterclockwise direction from a right side through an upper side to a left lower side and reaches the light source unit.

5. The lighting device according to claim 1, wherein:
the front frame is fixed by a screw member to a bottom bridge of a saddle-type vehicle.

6. The lighting device according to claim 5, wherein:
a drain hole is formed at a portion fixing the front frame to the bottom bridge.

7. A saddle-type vehicle with the lighting device according to claim 5, further comprising:
a license plate disposed on a front side of the saddle-type vehicle; and
a plate stay supporting the license plate;
wherein the plate stay and the front frame are fixed together to the bottom bridge by the screw member.

8. The saddle-type vehicle according to claim 7, wherein:
the plate stay comprises a plate-like member whose outer peripheral portion is bent downward.

* * * * *